United States Patent
Fujimoto et al.

(10) Patent No.: US 8,007,022 B2
(45) Date of Patent: Aug. 30, 2011

(54) FRONT WINDOW SHIELD FOR VEHICLE

(75) Inventors: Naotoshi Fujimoto, Saitama (JP); Seiji Yoshimoto, Saitama (JP); Haruko Okuyama, Saitama (JP); Katsuaki Taguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 460 days.

(21) Appl. No.: 12/069,561

(22) Filed: Feb. 11, 2008

(65) Prior Publication Data

US 2008/0197656 A1 Aug. 21, 2008

(30) Foreign Application Priority Data

Feb. 15, 2007 (JP) ................................. 2007-034461
Aug. 29, 2007 (JP) ................................. 2007-221965

(51) Int. Cl.
*B60J 7/00* (2006.01)
(52) U.S. Cl. ........................................ 296/84.1; 340/980
(58) Field of Classification Search .................. 296/84.1, 296/90, 96.18, 96.19; 33/264, 286; 116/28 R; 340/980, 901; 701/4
See application file for complete search history.

(56) References Cited

U.S. PATENT DOCUMENTS

| | | | | |
|---|---|---|---|---|
| 1,156,578 | A * | 10/1915 | Benecke | ............... 296/96.19 |
| 5,111,329 | A | 5/1992 | Gajewski et al. | |
| 6,107,943 | A * | 8/2000 | Schroeder | ................. 340/945 |
| 6,686,850 | B2 * | 2/2004 | Hausmann | .................. 340/967 |
| 6,688,007 | B2 * | 2/2004 | Ferron | ......................... 33/264 |
| 2003/0151272 | A1 | 8/2003 | Sugimoto et al. | |
| 2005/0068629 | A1 | 3/2005 | Fernando et al. | |
| 2005/0231336 | A1 | 10/2005 | Strohband et al. | |
| 2006/0175859 | A1 | 8/2006 | Isaac | |

FOREIGN PATENT DOCUMENTS

| | | |
|---|---|---|
| DE | 41 28 717 A1 | 3/1993 |
| DE | 10 2004 007 521 A1 | 2/2005 |
| DE | 10 2005 007 427 A1 | 8/2006 |
| GB | 2371912 * | 7/2002 |
| GB | 2 371 912 A | 8/2002 |
| GB | 2 393 698 A | 4/2004 |
| JP | 04-90415 | 8/1992 |
| JP | 06-127313 | 5/1994 |
| JP | 08-225043 | 9/1996 |
| JP | 2000-211355 | 8/2000 |
| JP | 2002-087060 A | 3/2002 |

* cited by examiner

*Primary Examiner* — Joseph Pape
(74) *Attorney, Agent, or Firm* — Carrier Blackman & Associates, P.C.; Joseph P. Carrier; William D. Blackman

(57) ABSTRACT

There is provided a vehicle having a simple and inexpensive structure that assists the driving sense. A front window shield 1 of a vehicle 100 is provided with a pair of marks 2 and 3 substantially horizontally aligned. The marks 2 and 3 are formed at the same height at the left and right sides of the front window shield 1. A driver perceives a virtual line L by the marks 2 and 3 on the front window shield 1, and trackings the line of sight W1 are induced to move such as to gather between the bottom end line (herein, a line of an instrument panel 6) and a virtual line L.

3 Claims, 12 Drawing Sheets

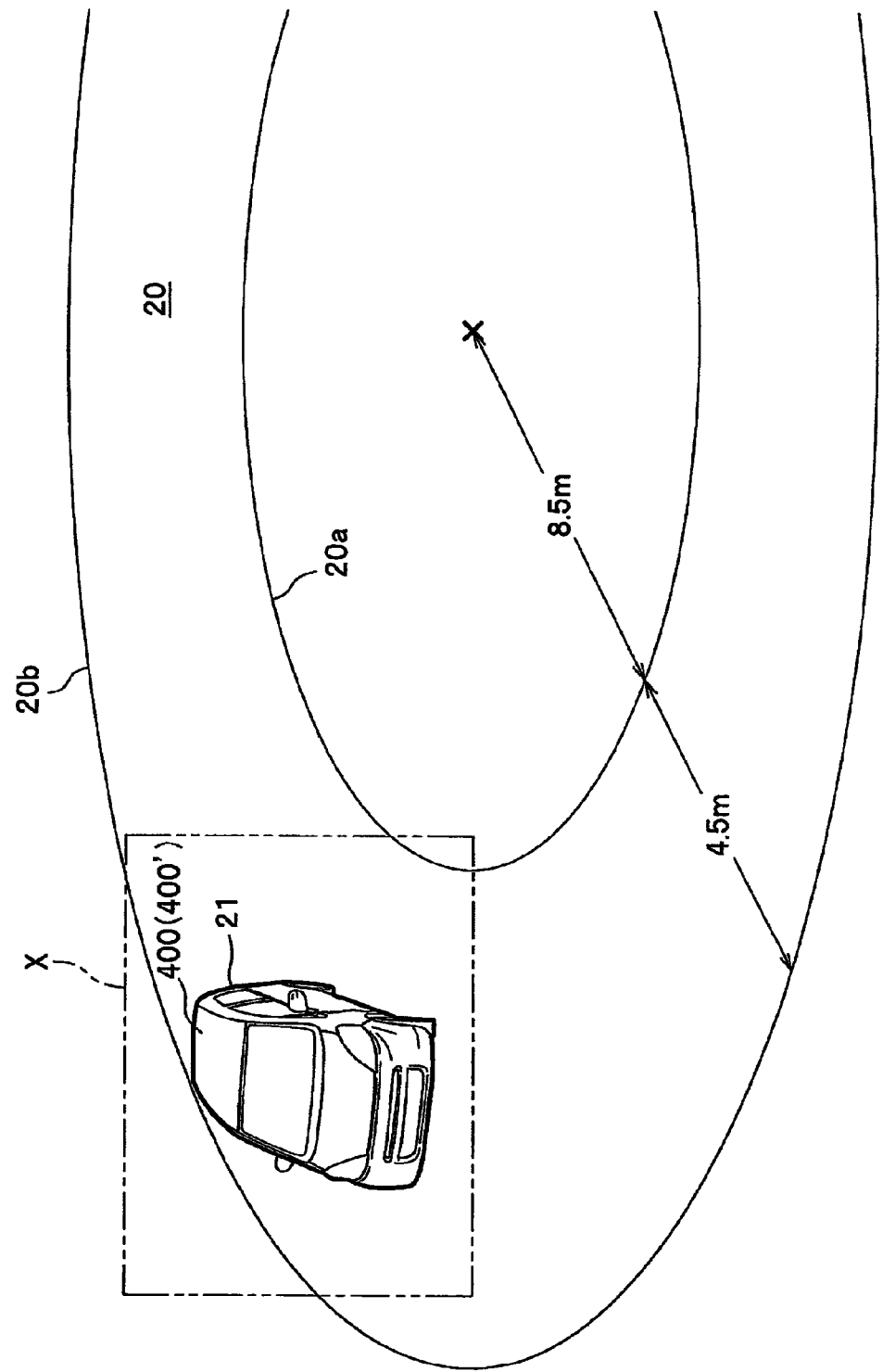

FRONT WINDOW SHIELD FOR VEHICLE

BACKGROUND OF THE INVENTION

1. Field of the Invention

The present invention relates to a front window shield for a vehicle, having a simple and low cost structure that assists driving sense.

2. Description of the Related Art

Conventionally, in a known technology, a liquid crystal panel is installed on a surface at the lower portion of a front window shield (front glass) of a vehicle, and a voltage is applied to the liquid crystal panel, corresponding to the running conditions so as to lower the transmission rate of the liquid crystal panel, thereby directing the line of sight of a driver to a region where the transmission rate is higher than the liquid crystal panel (for example, refer to Patent Documents 1 (Japanese Laid-Open Utility Model Application No. H04-90415 (paragraphs 0006 to 0009, and FIGS. 1 to 5) and Patent Document 2 (Japanese Laid-Open Patent Application No. 2000-211355 (paragraphs 0014 to 0015 and FIGS. 7 and 8)).

Further, in another known technology, a corner pole is provided at an end portion of a vehicle, such as the front end portion on the front passenger seat side, so that the end portion of the vehicle being invisible directly from inside the vehicle can be predicted with the assistance of the corner pole being visible through the front window shield (for example, refer to Patent Document 3 (Japanese Laid-Open Patent Application No. H06-127313 paragraph 0001 and FIGS. 1 and 7)). In still another known technology, a camera is provided at an end portion of a vehicle and the camera picks up an image of the end portion of the vehicle so as to display the image on a display in the vehicle (for example, refer to Patent Document 4 (Japanese Laid-Open Patent Application No. H08-225043 (paragraphs 0015 to 0016 and FIGS. 1 and 7)).

PROBLEMS TO BE SOLVED

In the technologies described in the above Patent Documents 1 and 2, the transmission rate of a liquid crystal panel is lowered during driving at a high speed to direct the line of sight to a region with a higher transmission rate, thereby directing the attention of a driver to the far front. However, tests by the inventors of the present invention proved that a line of sight scatters vertically and horizontally in a region with a higher transmission rate. In other words, particularly during normal driving, wasteful movement of a line of sight upward to the sky was observed. Further, since a controller to control the liquid crystal panel is necessary, the cost is high.

Further, in the technologies described in the above Patent Documents 3 and 4, since a center pole or camera is installed on a side face on the front side of a vehicle, the structure is complicated with a number of components, which does not reduce the load of an assembly worker. In the technology described in the above Patent Document 3, when the corner pole is not used, the corner pole is controlled to be put into the vehicle by electrical operation, which requires wiring and a controller, causing a high cost. Still further, in the technology described in the above Patent Document 4, displaying an image picked up by a camera on a display in a vehicle requires wiring and a display, causing a high cost.

Addressing problems as described above, an object of the invention is to provide a front window shield for a vehicle, having a simple and inexpensive structure for assisting driving sense.

SUMMARY OF THE INVENTION

In a first aspect of the invention, there is provided a front window shield for a vehicle, located at a front part of the vehicle and configured to secure a view of a driver in the vehicle, the front window shield including a window shield having at least one mark indicating a substantially horizontal direction. In this constitution, a simple and inexpensive structure including at least one mark enables a driver to move the line of sight with a substantially horizontal line be a reference, which inhibits scattering of the line of sight and assists the driving sense.

In a second aspect of the invention, the front window shield for a vehicle in the first aspect includes a pair of the marks, with a respective one of the marks formed on each of a right side and left side. In this constitution, the driver feels as if a virtual line is present connecting the right and left marks, and movement of the line of sight is provided with the virtual line as a reference, which inhibits scattering of the line of sight and assists the driving sense.

Since the driver can unconsciously or consciously perceive the virtual line, the line of sight is prevented from scattering to the upper side of the virtual line, and assists the driving sense such that the line of sight concentrates on the lower side of the virtual line. Further, just the perception by the driver of the virtual line prevents scattering up and down of the line of sight and assists the driving sense such that the line of sight moves along the virtual line. Further, just arranging the marks on the front window shield to make the virtual line perceivable does not interfere with the confirmation by the driver of a traffic signal or the like in the upper direction.

In this constitution, a simple structure that forms a pair of marks at the same height position on the right and left sides of the front window shield for a vehicle can easily assist the driving sense of the vehicle.

In a third aspect of the invention, for the front window shield for a vehicle in the second aspect, each of the pair of the marks is shaped in a triangle formed of a base along a front pillar and an apex off and opposite the base. In this constitution, the apexes of the right and left marks serve as arrows indicating a direction, which allows easy perception of a substantially horizontal virtual line connecting the left and right apexes.

In a fourth aspect of the invention, for the front window shield for a vehicle in the first aspect, the at least one mark is formed as a substantially horizontal line connecting a right end and left end of the front window shield. In this constitution, movement of the line of sight is promoted with the line formed on the front window shield as a reference similarly to a virtual line, which inhibits scattering of the line of sight and assists the driving sense.

In a fifth aspect of the invention, for the front window shield for a vehicle in the second or third aspect, the pair of the marks are arranged at positions higher than an eye point of the driver. In this constitution, the movement of the line of sight of the driver concentrates on the lower side of the horizon, which prevents directing the driver's attention to the range upper than the horizon as has occurred with a conventional front window shield, and allows the driver to stably pay attention to the road during running the vehicle.

In a sixth aspect of the invention, there is provided a front window shield for a vehicle, located at a front part of the vehicle and configured to secure a view of a driver in the vehicle, the front window shield including: a region with a lower transmission rate formed at a center of an upper portion or a lower portion of the front window shield; and a region with a higher transmission rate formed substantially in a U-shape or substantially in an inverted U-shape.

In this constitution, since a region with a higher transmission rate is formed substantially in a U-shape or substantially in an inverted U-shape, it is possible to direct the line of sight such as to avoid a substantially rectangular region with a lower transmission rate, thereby assisting the driving sense. Therefore, the height of the line of sight passing the center of the front window shield can be controlled, thereby inducing appropriate perception of the circumstances.

In a seventh aspect of the invention, there is provided a front window shield for a vehicle, located at a front part of the vehicle and configured to secure a view of a driver in the vehicle, the front window shield including regions with a lower transmission rate formed at a center of an upper portion and at a center of a lower portion of the front window shield; and a region with a higher transmission rate formed substantially in an H-shape.

In this constitution, since the region with a higher transmission rate is formed substantially in an H-shape, movement of the line of sight is directed to the region with a higher transmission rate substantially in an H-shape, thereby assisting the driving sense. Particularly at the center of the front window shield, the line of sight is induced to move horizontally, passing the substantially I-shape portion (a horizontal bar of the substantial H-shape), thereby directing the line of sight to a range higher than the vicinity of the vehicle and lower than the height adjacent to the horizon. Thus, the height of the line of sight passing the center of the front window shield can be controlled, thereby inducing appropriate perception of the circumstances.

In an eighth aspect of the invention, there is provided a front window shield for a vehicle, located at a front part of the vehicle and configured to secure a view of a driver in the vehicle, the front window shield including a bottom end portion being in a substantially-horizontal linear shape and disposed at a height same as horizontal waist lines on both sides.

In this constitution, since a frame formed by the bottom end portion of the front window shield and the waist lines enables guessing of the vehicle width by the lateral portions or the front portion of the vehicle, thereby assisting the driving sense of the driver. Therefore, the frame can be used as a reference (comparator) for comparison between the circumstances and the vehicle.

Herein, as the frame is formed adjacent to the driving seat, it is easy to sensuously perceive the vehicle width. Thus, the driver can easily have the sense of distance to a building or wall on a side. Further, the driver can imagine extension lines forward from the waist lines and imagine the crossing with a horizon so as to be able to guess the vehicle width far ahead. Thus, the driver can perceive the position relationship between the own vehicle and the surrounding circumstances. Further, in this constitution, it is possible to construct an end assistance (an assistance at the bottom end) without fitting an additional part, such as a corner pole, and just by changing a shape of the structure already used in the vehicle.

In a ninth aspect of the invention, there is provided a front window shield for a vehicle, located at a front part of the vehicle and configured to secure a view of a driver in the vehicle, the front window shield including: a bottom end portion being formed in a substantially-horizontal curved shape and having an end assistance so that the bottom end portion is visually perceived in a substantially-horizontal linear shape when viewed from a driver seat. In this constitution, a frame formed by the end assistance at the bottom end portion of the front window shield and the waist lines enables guessing of the vehicle width at the side or the front, thus assisting the driving sense. Therefore, the frame can be used as a reference (comparator) for comparison between the circumstances and the vehicle.

In a tenth aspect of the invention, a front window shield for a vehicle, located at a front part of the vehicle and configured to secure a view of a driver in the vehicle, the front window shield including: a bottom end portion being in a substantially-horizontal linear shape, wherein both left and right ends of the bottom end portion are crossed with respective front pillars on both sides in such a manner that both the left and right ends of the bottom end portion and the respective front pillars are visually perceived to form respective edge shapes. In this constitution, a frame formed by the end assistance at the bottom end portion and the front pillars enables the driver to perceive the vehicle width, thus assisting the driving sense. Therefore, the frame can be used as a reference (comparator) for comparison between the circumstances and the vehicle.

BRIEF DESCRIPTION OF THE DRAWINGS

FIG. 11 is a perspective view showing the state where a vehicle is driving in a circuit course in a position deviation test;

PREFERRED EMBODIMENTS OF THE INVENTION

Figure 1:
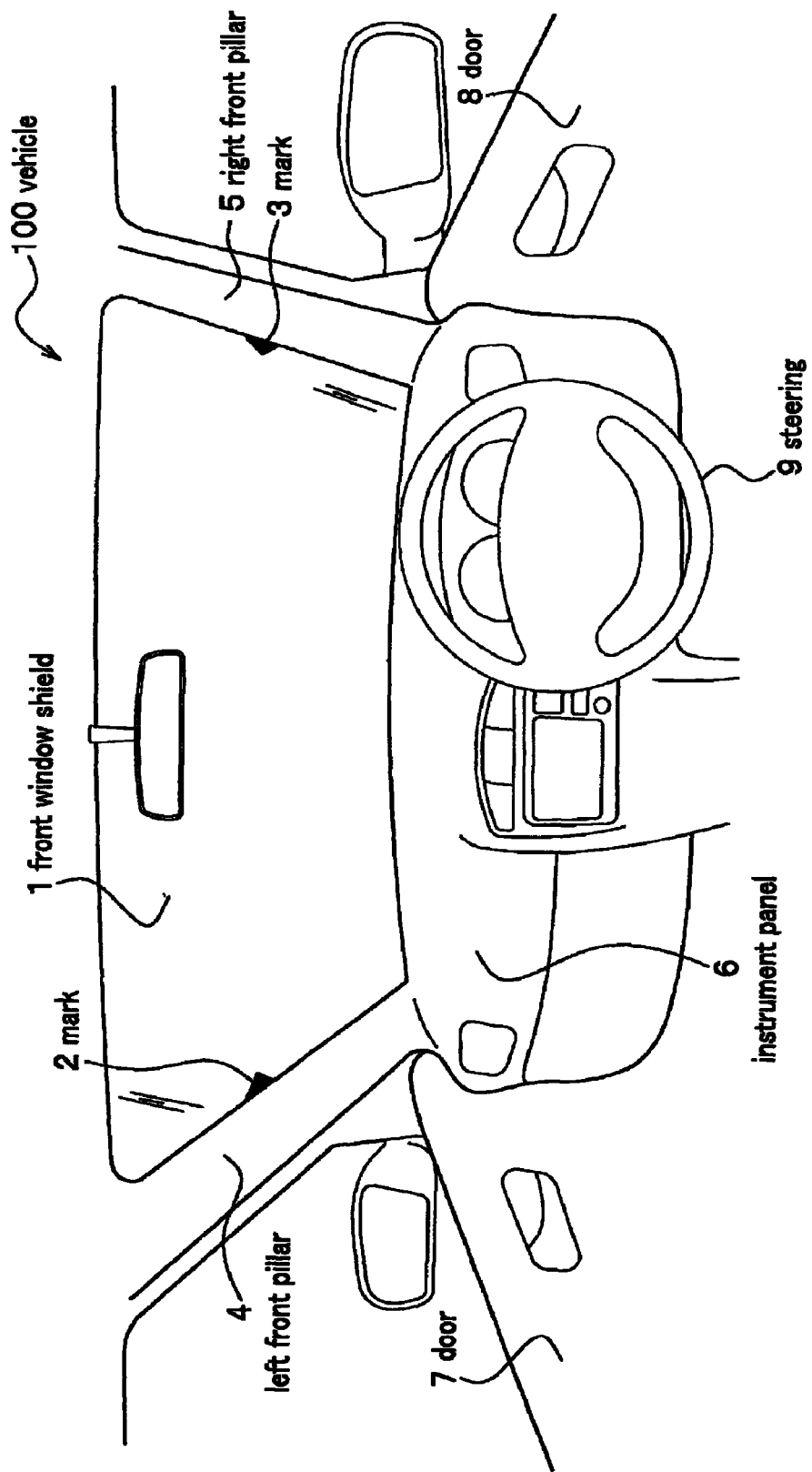
FIG. 1 is a schematic diagram showing a front window shield for a vehicle in Embodiment 1.

Embodiments of the present invention will be described, referring to the drawings.

Embodiment 1

First, a front window shield for a vehicle in Embodiment 1 will be described, referring to a schematic diagram, shown in FIG. 1. Herein, description will be made for a case where a vehicle is on a horizontal road surface.

As shown in FIG. 1, for a vehicle 100, a front window shield for a vehicle (hereinafter also referred to as "a front window shield") 1 is provided with a pair of marks 2 and 3 indicating a substantially horizontal direction. The marks 2 and 3 are formed at the same height on the right and left sides of the front window shield. Thus, a driver can perceive a virtual line connecting a pair of marks 2 and 3.

The marks 2 and 3 are formed of so-called black ceramic print (hereinafter, referred to as "black ceramic"). Therefore, in forming black ceramic at the left and right ends of a glass for the front window shield 1 or the like, a part of the left and right ends is made into a pair of isosceles triangles, so as to form marks 2 and 3 on the front window shield 1. Although in the present Embodiment 1, black ceramic is employed to form the marks 2 and 3, formation of the marks 2 and 3 is not limited to black ceramic, and the marks may be formed by coloring the front window shield 1 with an arbitrary dye or by sticking a seal-formed body on the front window shield 1 as long as such a shape can be formed.

The schematic diagram, shown in FIG. 1, mainly shows a left front pillar 4 and right front pillar 5 which support the front window shield 1 at the left and right, an instrument panel 6, doors 7 and 8, and a steering 9. In the present Embodiment 1, a right-hand steering vehicle is exemplarily shown.

Figure 2:
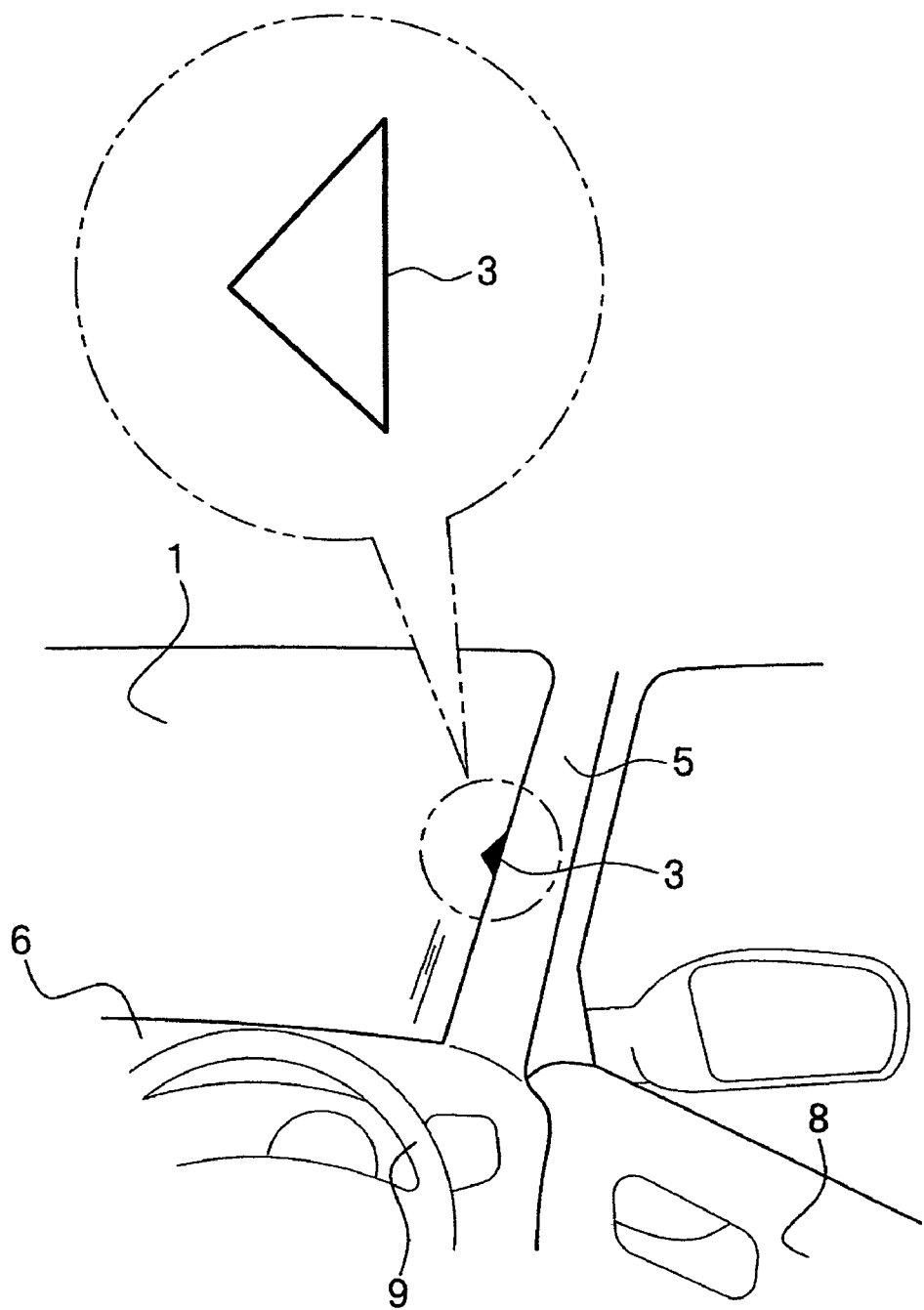
FIG. 2 is a partial schematic diagram showing the right side of the front window shield, shown in FIG. 1, including an enlarged view of a mark.

Now, referring to the schematic diagram shown in FIG. 2, the front window shield shown in FIG. 1 will be described. As shown in FIG. 2, the mark 3 is shaped in a triangle formed of a base along a right front pillar 5 supporting the front window shield 1, and an apex off and opposite the base. Particularly, herein, the mark 3 is formed in an isosceles triangle. This mark 3 is satisfactory, for example, with an isosceles triangle defined by a base of approximately 4.0 mm and the other two sides of approximately 2.0 mm. The mark 2, shown in FIG. 1, is formed in an isosceles triangle being a line symmetry of the mark 3 with respect to the vertical line. Accordingly, description of the mark 2 is omitted.

Although in the present Embodiment 1, the pair of marks 2 and 3 are formed at the same height position, the marks 2 and 3 may be formed substantially at the same height position as long as a substantially horizontal virtual line is perceivable. Further, although in the present Embodiment 1, one pair of marks 2 and 3 are formed in isosceles triangles, the shape is not limited thereto as long as the virtual line is perceivable. For example, any one of a circular shape, rectangular shape, other various shapes, character, design, and pattern, or a combination of these may be employed. Still further, any size of the marks 2 and 3 is applicable as long as the virtual line is perceivable. Yet further, the sizes and shapes may be different between the two marks.

Further, the virtual line may be a conceptual line, without limitation of a Euclid geometrical width, but is a concept containing a band form with a limited width. In the present Embodiment 1, it is possible to perceive a band form approximately in the same width as the width of the base portions of the marks 2 and 3.

Further, although in the present Embodiment 1, the marks 2 and 3 are formed substantially at the intermediate height position of the front window shield 1, the marks 2 and 3 may be formed at any height position. Still further, although in the present Embodiment 1, a pair of marks 2 and 3 are formed so as to perceive a single virtual line, a plurality of pairs of marks 2 and 3 may be formed so as to perceive plural virtual lines. For example, two virtual lines may be used to be perceivable so as to divide the front window shield 1 into three parts from the top to the bottom.

Figure 3A:
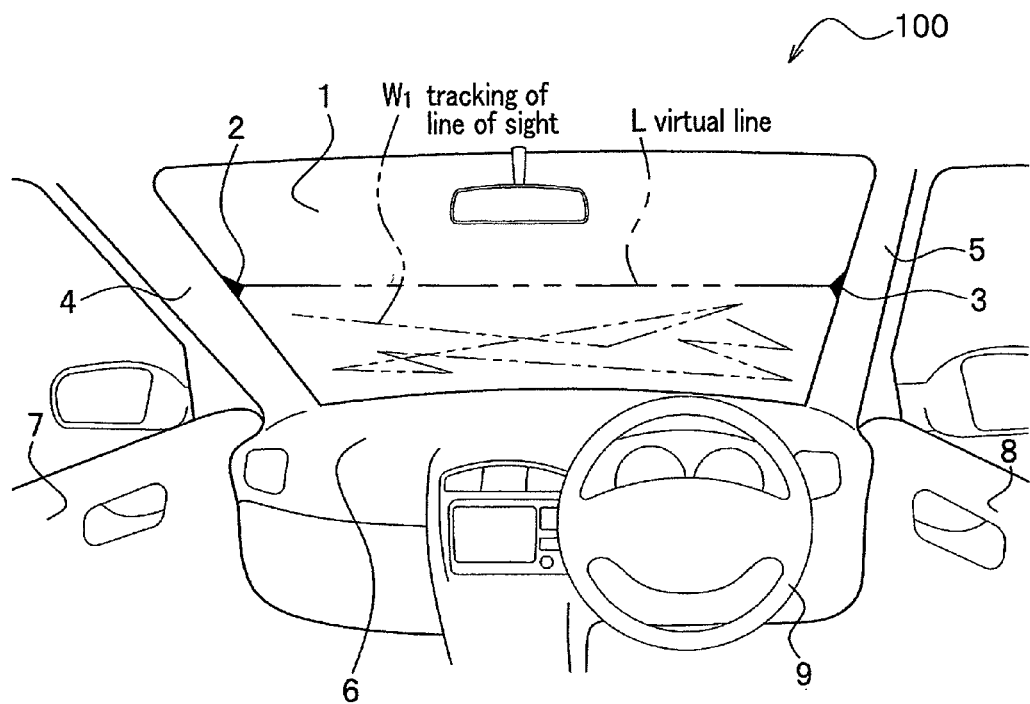
FIG. 3A is a schematic diagram showing the movement of the line of sight on the front window shield for a vehicle, shown in FIG. 1.
Figure 3B:
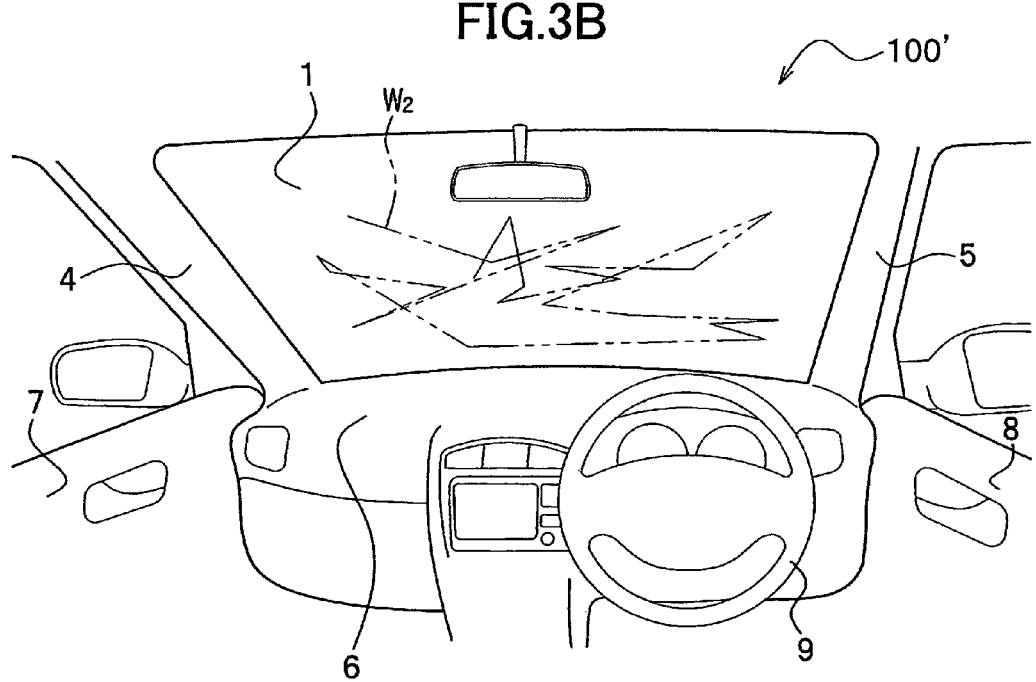
FIG. 3B is a schematic diagram showing the movement of the line of sight on a front window shield for a vehicle as a comparative example.

Now, a moving state of the line of sight on the front window shield 1, shown in FIG. 1, will be described, referring to FIG. 3. FIG. 3A is a schematic diagram showing the movement of the line of sight on the front window shield, shown in FIG. 1, while FIG. 3B is a schematic diagram showing the movement of the line of sight on a front window shield in a comparative example of the present Embodiment 1. Herein, trackings of line of sight W1 and W2 showing the movement of the line of sight in FIG. 3A and FIG. 3B were obtained, using an eye mark recorder (EMR-8 manufactured by NAC Co.).

As shown in FIG. 3A, in Embodiment 1, the driver consciously or unconsciously perceives a virtual line L by the marks 2 and 3 on the front window shield 1 so that the trackings of line of sight W1 move to gather between the bottom end line (herein, the line of the instrument panel 6) of the front window shield 1 and the virtual line L. Particularly, the line of sight moving in the left/right direction becomes substantially horizontal with less up-down movement. That is, by the front window shield 1 in Embodiment 1, it is possible to make the line of sight of the driver concentrate on the lower side of the marks 2 and 3.

Further, when the driver has become used to the marks 2 and 3 and the lower side of the virtual line L at a low speed has been imprinted in the mind of the driver, it is expected that the line of sight unconsciously concentrates on the lower side than the virtual line L at a low speed. Further, when the driver visually confirms a traffic signal or the like in the upper direction with respect to the vehicle, the driver can consciously move the line of sight to the upper side of the virtual line L.

On the other hand, since the vehicle 100', shown in FIG. 3B, is not provided with marks 2 and 3, the tracking of line of sight W2 of the driver is unstable both at high speed and low speed, and the line of sight scatters. Accordingly, if the tracking of line of sight W1 in FIG. 3A and the tracking of line of sight W2 in FIG. 3B are compared, it is understood in Embodiment 1 that scattering of the line of sight is inhibited and the driving sense is assisted. Therefore, the phenomenon that the line of sight of a driver wastefully moves upward is inhibited except when viewing an indication or traffic signal.

1st Modified Example

Figure 4A:
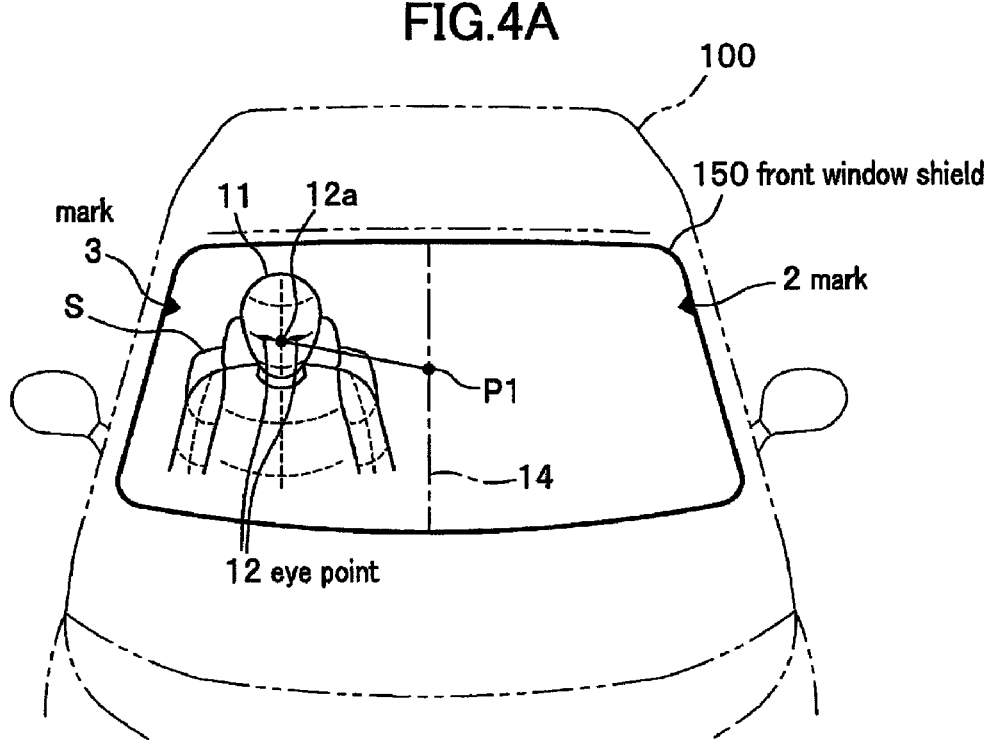
FIG. 4A is a perspective view showing a 1st modified example of the front window shield for a vehicle in Embodiment 1, in association with eye points, wherein the front window shield for a vehicle is viewed down from a front and obliquely upper position with respect to the vehicle.
Figure 4B:
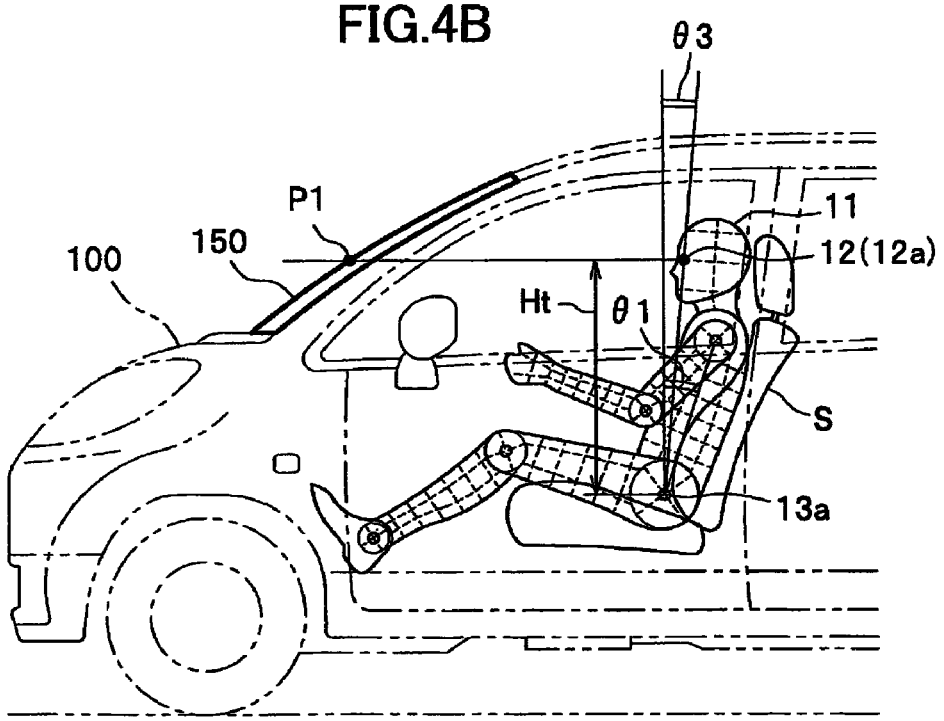
FIG. 4B is an illustration of the eye points, being a side view of the front window shield viewed from the left side of the vehicle.
Figure 5A:
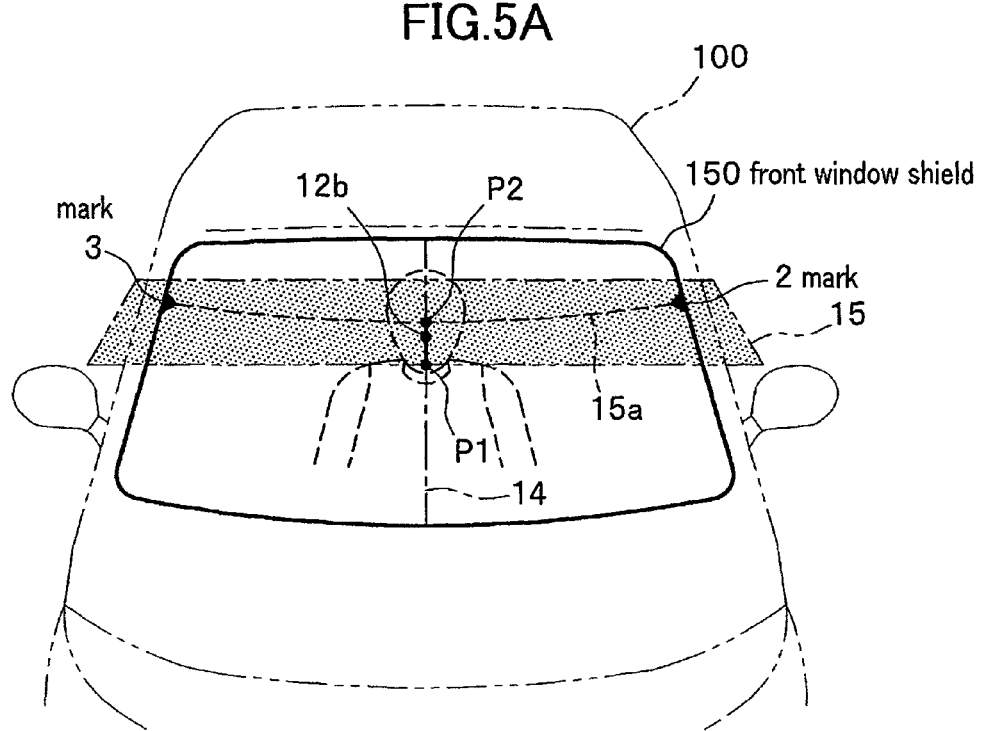
FIG. 5A is a perspective view showing the height of marks on a front window shield for a vehicle, in FIG. 4A, in association with eye points, wherein the front window shield for a vehicle is viewed down from a front and obliquely upper position with respect to the window.
Figure 5B:
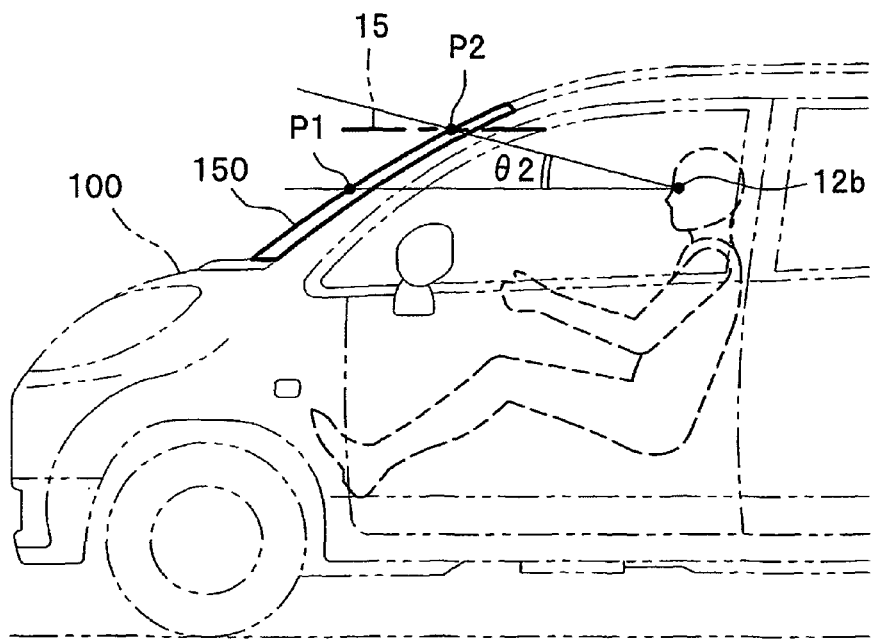
FIG. 5B is a side view of the front window shield for a vehicle in FIG. 5A, viewed from the left side of the vehicle.

Now, a 1st modified example of the front window shield (refer to FIG. 1) in Embodiment 1 will be described. FIG. 4A referred to in the following is a perspective view of the 1st modified example of the front window shield in Embodiment 1, associated with the eye points, and a diagram viewing down the front window shield for a vehicle from a front and obliquely upper position with respect to the vehicle. FIG. 4B is an illustration of the eye points, and is a side view showing the vehicle viewed from the lateral left side. FIG. 5A is a perspective view of the height of the marks on the front window shield for the vehicle, shown in FIG. 4A, in association with the eye points of the driver, and a view showing the front window shield for a vehicle viewed down from the front and obliquely upper position with respect to the vehicle. FIG. 5B is a side view showing the front window shield for a vehicle, in FIG. 5A, viewed from the lateral left side of the vehicle. Here, description will be made on a front window shield, for a vehicle, having a curved surface being convex outward (forward) of the vehicle. For structural elements same as in Embodiment 1 will be given with the same reference symbols, and detailed description of which will be omitted.

As shown in FIG. 4A, a front window shield 150 in the 1st modified example is provided with marks 2 and 3 at respective positions higher than the eye points 12 that correspond to the height of the eyes of a driver 11 of an ordinary body type. First, the eye points 12 will be described.

The eye points 12 can be set, using a 50% tile manikin of an adult male (hereinafter, also referred to merely as "manikin") specified by JIS D 4607 "Three Dimensional Manikin for Use in Defining Automobile Seating Accommodation (3DM-JM 50)" or ISO 6549 "Road vehicles-Procedure for H-point determination".

The eye points 12 can be defined as reference points in the cabin, and specifically defined by the method described in "Announcement defining details of safety standard of road trucking vehicle (Ministry of Land, Infrastructure and Transport Government of Japan) Appendix 81". However, the eye points 12 may be defined in other ways, without being limited thereto.

In the present 1st modified example, as shown in FIG. 4B, a manikin is seated at a driver seat S at a predetermined position by a seating method specified by ISO 6549, and the height Ht of the eye points 12 is set to be vertically 635 mm above from H-point 13a (also referred to as DRP (Driver's Reference Point)) being the hip point of the manikin. In the 1st modified example, the torso angle $\theta_1$ (also referred to as back angle) is 25 degrees, and when the torso angle $\theta_1$ is 25 degrees, the backward inclination angle $\theta_3$ of the center point 12a (refer to FIG. 4A) between the eye points 12 is 8 degrees. The torso angle $\theta_1$ is not limited to 25 degrees, and may be set suitably. In this case, the positions of eye points 12 are adjusted to be the above-described reference point, corresponding to the torso angle $\theta_1$.

As described above, the marks 2 and 3 (refer to FIG. 4A) of the 1st modified example are arranged at a position higher than the eye points 12. In other words, as described above, for the vehicle 100 on a horizontal road surface, the marks 2 and 3 are arranged, as shown in FIG. 4A, higher than an eye level point P1 provided on a left-right center line 14 of the front window shield 150 and at the same height as the eye points 12. Herein, the left-right center line 14 is defined on a surface of the front window shield 150 provided with the marks 2 and 3. Concretely, for example, in a case where the marks 2 and 3 are provided on the surface inside the vehicle, the left-right center line 14 is defined also on the surface inside the vehicle, and in a case where the marks 2 and 3 are provided on the surface outside the vehicle, the left-right center line 14 is defined also on the surface outside the vehicle. Further, in a case where the marks 2 and 3 are provided for the front window shield 150, sandwiched by superimposed glass sheets, the left-right center line is defined on the joining surface between the glass sheets. Referring to a mark height point P2 defined at the same height as the marks 2 and 3 and on the left-right center line 14, a preferable height of the marks 2 and 3 is set to a height, as shown in FIG. 5A and FIG. 5B, where the angle $\theta_2$ defined by a line that connects a point 12b (hereinafter, referred to as "center point 12b") being horizontally moved from the eye-point center point 12a to the center of the vehicle with respect to the lateral direction and the eye level point P1 and a line that connects the center point 12b and the mark height point P2 is within a range of 5 to 25 degrees.

Herein, the marks 2 and 3 and the mark height point P2 are present on the same horizontal plane 15, wherein the horizontal plane 15 and the above-described surface, of the front window shield 150, on which the marks 2 and 3 are provided, intersect with each other, forming an intersection curve being convex forward, corresponding to the curvature of the front window shield 150.

A visible curve 15a formed on the above described surface of the front window shield 150 provided with the marks 2 and 3, the visible curve following the virtual curve 15a, may be arranged to be "a mark that indicates a substantially horizontal direction" according to the above described first aspect, as the visible curve alone to take the place of the marks 2 and 3, or along with the marks 2 and 3.

Further, although the marks 2 and 3 are formed at the same height for the front window shield 150 of the 1st modified example, the marks 2 and 3 may be formed, in the present invention, at different heights as long as the marks 2 and 3 indicate a substantially horizontal direction.

Figure 6A:
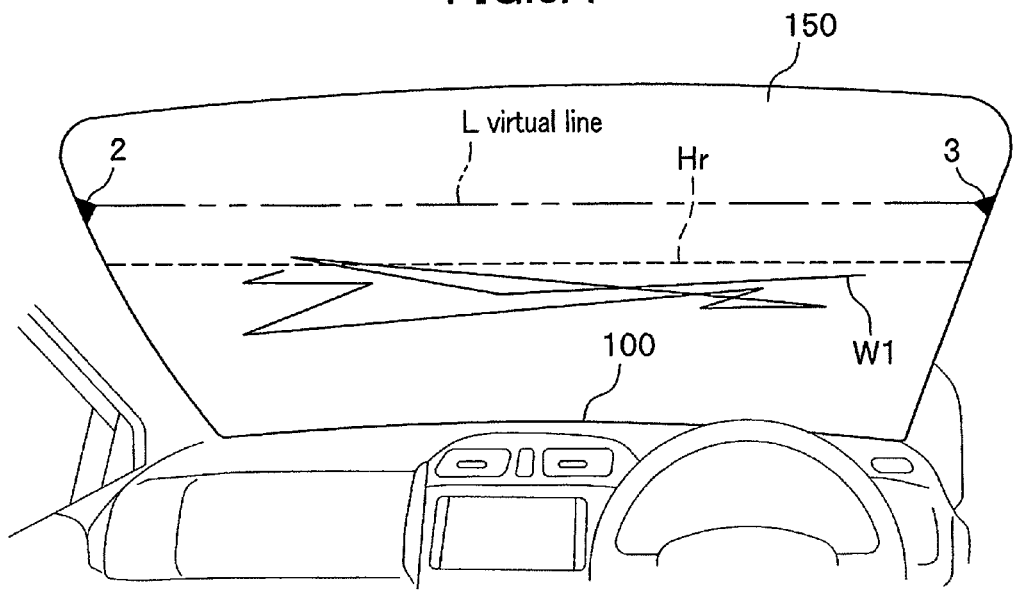
FIG. 6A is a schematic diagram showing the movement of the line of sight on the front window shield for a vehicle, shown in FIG. 4A.
Figure 6B:
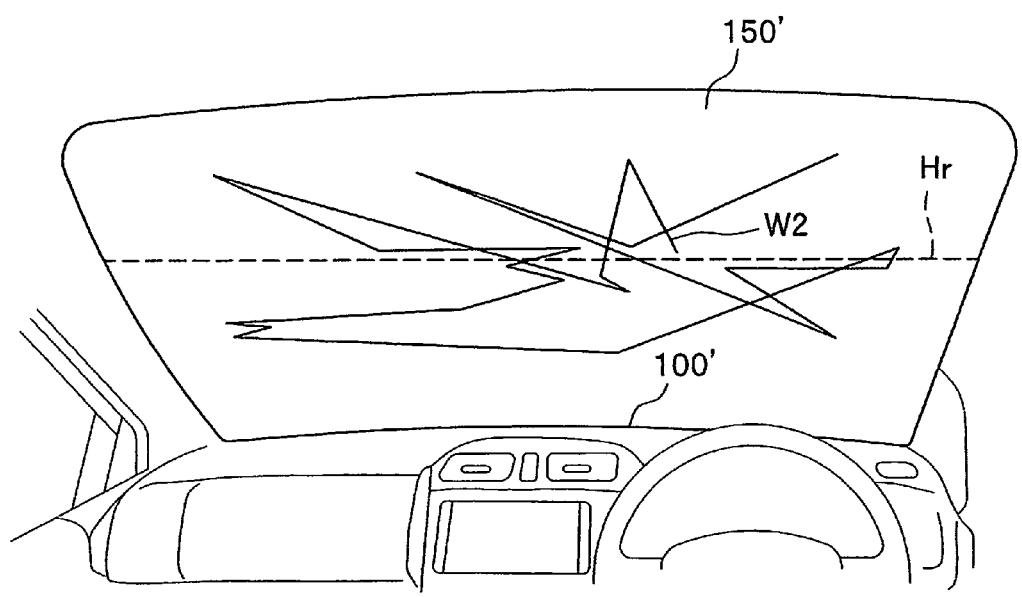
FIG. 6B is a schematic diagram showing the movement of the line of sight on the front window shield for a vehicle, as a comparative example.

Next, functions and effects of the front window shield 150 in the 1st modified example will be described below. FIG. 6A referred to here is a schematic diagram showing the movement of the line of sight at the front window shield for a vehicle, shown in FIG. 4A, while FIG. 6B is a schematic diagram showing the movement of the line of sight at a front window shield for a vehicle, as a comparative example. The trackings of line of sight W1 and W2 showing the movement of the line of sight in FIG. 6A and FIG. 6B were obtained, using the eye mark recorder (EMR-8 manufactured by NAC Co.).

In general, when the driver 11 (refer to FIG. 4B) has consciously decided a horizontal line of sight at the height of the driver's eyes, the driver 11 tends to take a view of a landscape outside the vehicle substantially at the same height as the horizon. That is, in a vehicle 100 (refer to FIG. 4A) on a horizontal road surface allowing a wide and well-seen view, the driver 11 decides the line of sight at the same height as the horizon, which is seen as a cut-end of the surface of the road far ahead.

Concretely, as shown in FIG. 6B for example, with a conventional front window shield 150' (the comparative example) without marks 2 and 3, the driver 11 (refer to FIG. 4B) comes to see the horizon Hr through the front window shield 150' by a horizontal line of sight. In this situation, the inventors confirmed the following fact. That is, when the driver 11 runs a vehicle 100' having such a front window shield 150', the driver perceives the landscape seen through the front window shield 150', wherein the landscape is perceived to be moving relatively, which greatly scatters the tracking of line of sight W2 of the driver 11 up and down on the front window shield 150' with the horizon Hr be the boundary.

On the other hand, as shown in FIG. 6A, with the front window shield 150, of the 1st modified example, provided with the marks 2 and 3 higher than the eye points 12 (refer to FIG. 4A), the tracking of line of sight W1 of the driver (refer to FIG. 4B) concentrates on the lower side of the horizon Hr, which was proved by measurement of the line of sight, using the above-described eye mark recorder. Particularly, from the fact that the tracking of line of sight W1 concentrates on the lower side of the horizon Hr even in the left-right central part (central part) of the front window shield 150, it is understood that the driver 11 consciously or unconsciously perceives the virtual line L connecting the marks 2 and 3, thereby concentrating the movement of the line of sight on the lower side of the horizon Hr. Further, the front window shield 150 (refer to FIG. 6A) can direct the line of sight of the driver 11 toward the surface of the road adjacent to the horizon Hr, compared with the conventional front window shield 150' (refer to FIG. 6B).

By the front window shield 150 of the 1st modified example, since the movement of the line of sight of the driver 11 can be concentrated on the lower side of the horizon Hr, it is possible to prevent directing the attention of the driver 11 to the range higher than the horizon Hr, as has occurred with a conventional front window shield 150', and allows the driver 11 to stably pay attention to the road during driving the vehicle 100.

In the 1st modified example, a front window shield 150 which is convex toward outside (forward) the vehicle has been described. However, a front window shield in a flat plate shape can also be employed in the invention. In this case, a mark corresponding to the curve 15a (refer to FIG. 4A) on the front window shield 150 in the 1st modified example is formed in a line.

2nd Modified Example

Figure 7A:
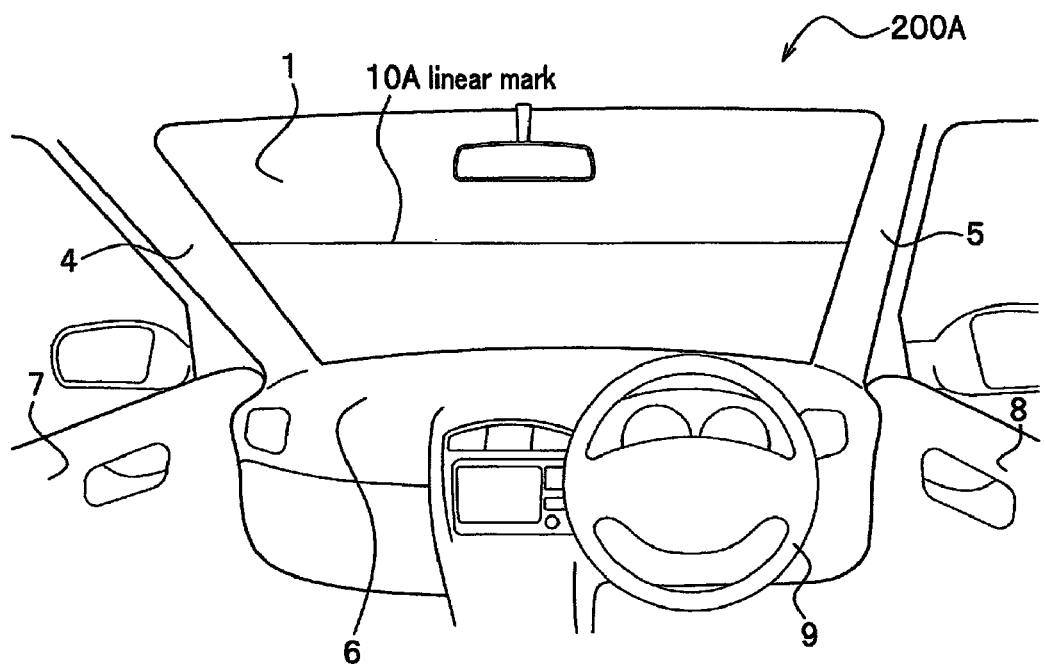
FIG. 7A is a schematic diagram showing a front window shield for a vehicle, as a 2nd modified example.
Figure 7B:
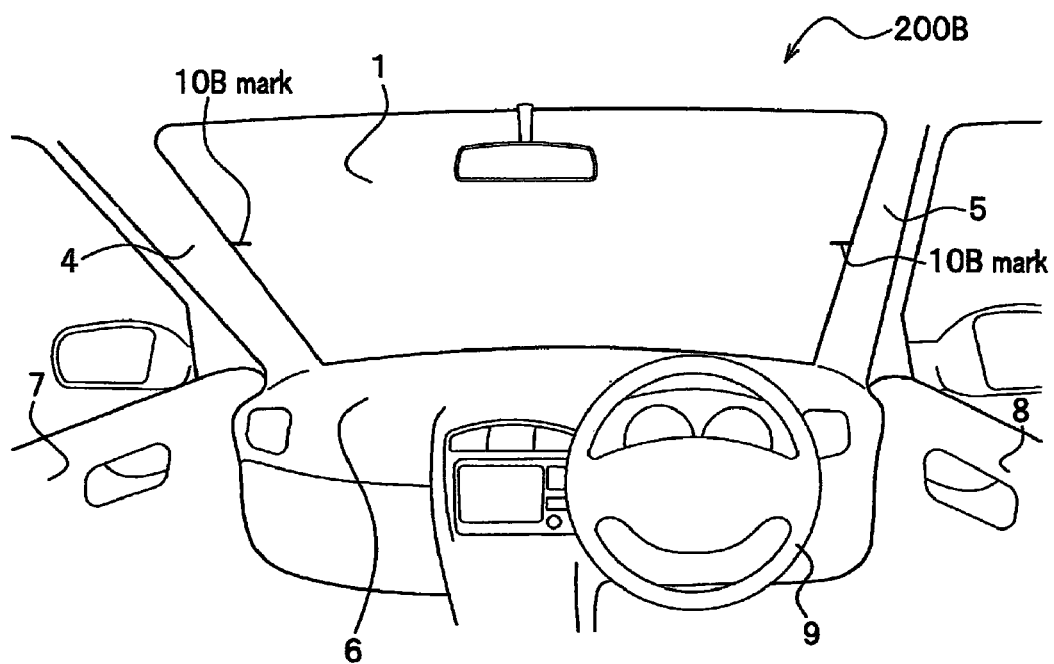
FIG. 7B is a schematic diagram showing a front window shield for a vehicle, as a 2nd modified example.

Next, referring to the schematic views shown in FIGS. 7A and 7B, a front window shield as a 2nd modified example in Embodiment 1 will be described. Reference symbols 1, 4, 5, 6, 7, 8 and 9 in FIGS. 7A and 7B represent the same parts as the corresponding parts shown in FIG. 1. As shown in FIG. 7A, for a vehicle 200A, a linear mark 10A is formed on a front window shield 1. This linear mark 10A also may be formed of black ceramic. As a driver can visually perceive the horizontal liner mark 10A, the linear mark 10A functions the same as the virtual line L by the marks 2 and 3.

As shown in FIG. 7B, for a vehicle 200B, marks 10B are formed on the left side and the right side of a front window shield 1. These marks 10B are an example where the marks 2 and 3 are formed in a rectangular shape. Herein, the marks 10B are formed in a horizontally elongated rectangular shape. The same as perceiving the virtual line L by the marks 2 and 3, the driver can perceive a virtual line also with such marks as marks 10B. The linear marks 10A and 10B may also be formed of black ceramic.

In the above description, each of the marks 2, 3, 10B and the linear mark 10A (hereinafter, referred to as "marks 2 and the like") is formed of black ceramic at a constant position of the same height for the vehicles 100, 200B and 200A (hereinafter, referred to as "vehicle 100 and the like") However, the marks 2 and the like may be arranged to be movable up and down. For example, a structure may include left and right marks 2 and the like as a structure movable relative to the front window shield 1, and a slide mechanism, not shown, for moving the marks 2 and the like up and down. Such a structure enables adjustment of the height of the marks 2 and the like, corresponding to the height of the sitting height of the driver or the height of the seat. In this case, the slide mechanism, not shown, may be fitted on the front window shield 1 or the front pillars 4 and 5. Also, the marks 2 and the like may be formed on the front pillars 4 and 5 without a slide mechanism.

Embodiment 2

Figure 8:
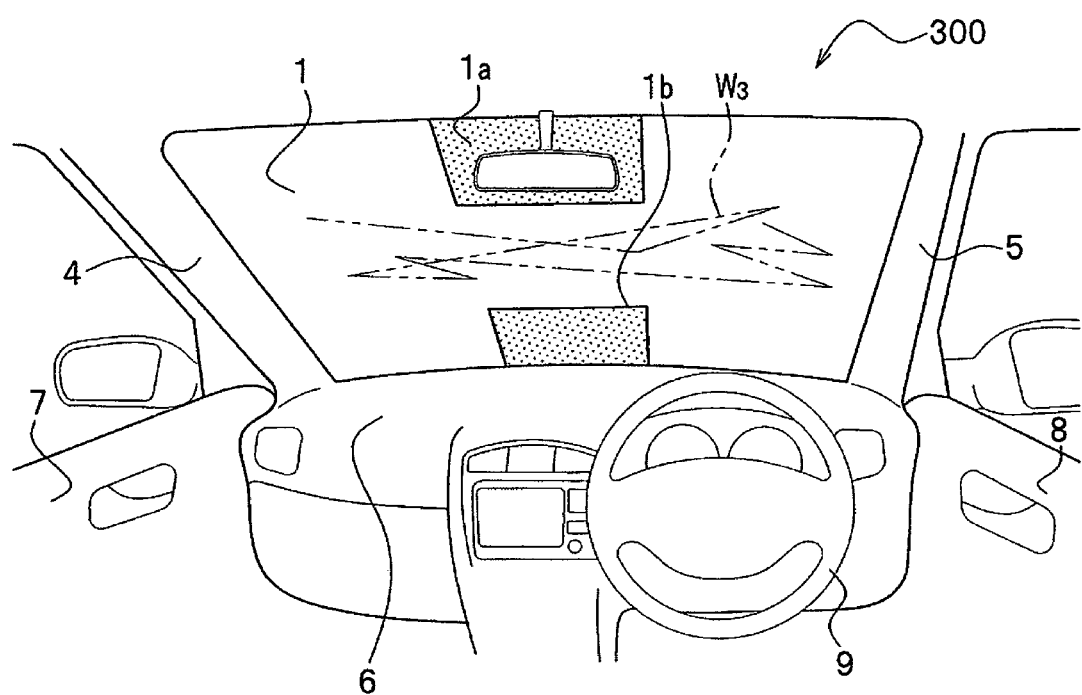
FIG. 8 is a schematic diagram showing a front window shield for a vehicle in an embodiment 2.

Now, a front window shield in an Embodiment 2 will be described, referring to a schematic diagram, shown in FIG. 8. The reference symbols 1, 4, 5, 6, 7, 8 and 9 in FIG. 8 represent the same parts as the corresponding parts, shown in FIG. 1. For a vehicle 300, regions 1a and 1b with a lower transmission rate are formed at the center of a lower portion and an upper portion of the front window shield 1. Therefore, the region with a higher transmission rate excluding the regions 1a and 1b with the lower transmission rate is formed substantially in an H-shape.

Regarding the difference in the transmission rate between the region with the higher transmission rate and the regions with the lower transmission rate, any ratio may be applied for the difference as long as the difference of the regions can be recognized. Further, the regions 1a and 1b may be formed such that the transmission rates are different when the regions are viewed from the driving seat side (herein, the right side). The regions 1a and 1b are formed by sandblasting the front window shield 1. However, without limited thereto, any structure capable of reducing the transmission rate (resolution) may be employed. For example, the regions 1a and 1b may be formed, drawing a dot pattern. Further, the regions 1a and 1b may be formed by coloring or sticking a seal. Still further, although the regions 1a and 1b are arranged to have the same transmission rate entirely inside the regions herein, the transmission rate may not be constant. Yet further, the regions 1a and 1b may be represented only by frames in a rectangular shape.

Next, the moving state of the line of sight on the front window shield 1, shown in FIG. 8, will be described. The tracking of line of sight W3 showing the movement of the line of sight, shown in FIG. 8, was obtained, using the eye mark recorder ((EMR-8 manufactured by NAC Co.). In this case, the driver perceives the regions 1a and 1b on the front window shield 1, and when the line of sight moves in the central part of the front window shield 1, the line of sight draws the tracking of line of sight W3, avoiding the regions 1a and 1b. Accordingly, the line of sight becomes substantially horizontal at the central part of the front window shield 1, and thus the height of the line of sight being controlled. On the other hand, in a case where regions 1a and 1b are not formed on the front window shield 1, the line of sight scatters, drawing the tracking of line of sight W2, as shown in FIG. 3B.

Further, since the regions 1a and 1b are different from the rest only in having a lower transparency, the driver can visually perceive with intention the circumstantial information seen through the regions 1a and 1b without any difficulty. Accordingly, there is no problem with safety. Further, also in Embodiment 2, when the driver becomes used to the regions 1a and 1b, it is expected that the driver can unconsciously move the line of sight to the H-shaped part with a high transparency during normal driving.

In the present Embodiment 2, although a case where both the region 1a and the region 1b are formed on the upper portion and the lower portion has been described, only one of the region 1a and region 1b may be formed at the center of the upper portion or the lower portion. In this case, the region with a higher transmission rate which excludes the region 1a or 1b with a lower transmission rate is formed substantially in a U-shape or substantially in an inverted U-shape.

When only the region 1a is formed, the driver moves the line of sight in the substantial U-shape, avoiding the region 1a. Therefore, in the central part of the front window shield 1, the line of sight can be concentrated on the upper side of the height of the region 1a, thereby the height of the line of sight being controlled.

When only the region 1b is formed, the driver moves the line of sight in the substantial inverted U-shape, avoiding the region 1b. Therefore, in the central part of the front window shield 1, the line of sight can be concentrated on the upper side of the height of the region 1b, thereby the height of the line of sight being controlled.

Accordingly, in the present Embodiment 2, it is understood that scattering of the line of sight is inhibited, and the driving sense is assisted. Thus, the phenomenon that the line of sight of a driver wastefully moves to the upper direction is inhibited except when viewing an indication or traffic signal, and also the phenomenon that the line of sight of the driver wastefully moves to the lower direction is inhibited. Also, the line of sight can be directed higher than the vicinity of the vehicle and lower than the height at the vicinity of the horizon. Therefore, it is possible to avoid the situation where the driver concentrates on positioning the vehicle within a lane, and the line of sight is frequently directed to a position in the vicinity of the vehicle, which a beginning driver is apt to face.

Embodiment 3

Figure 9:
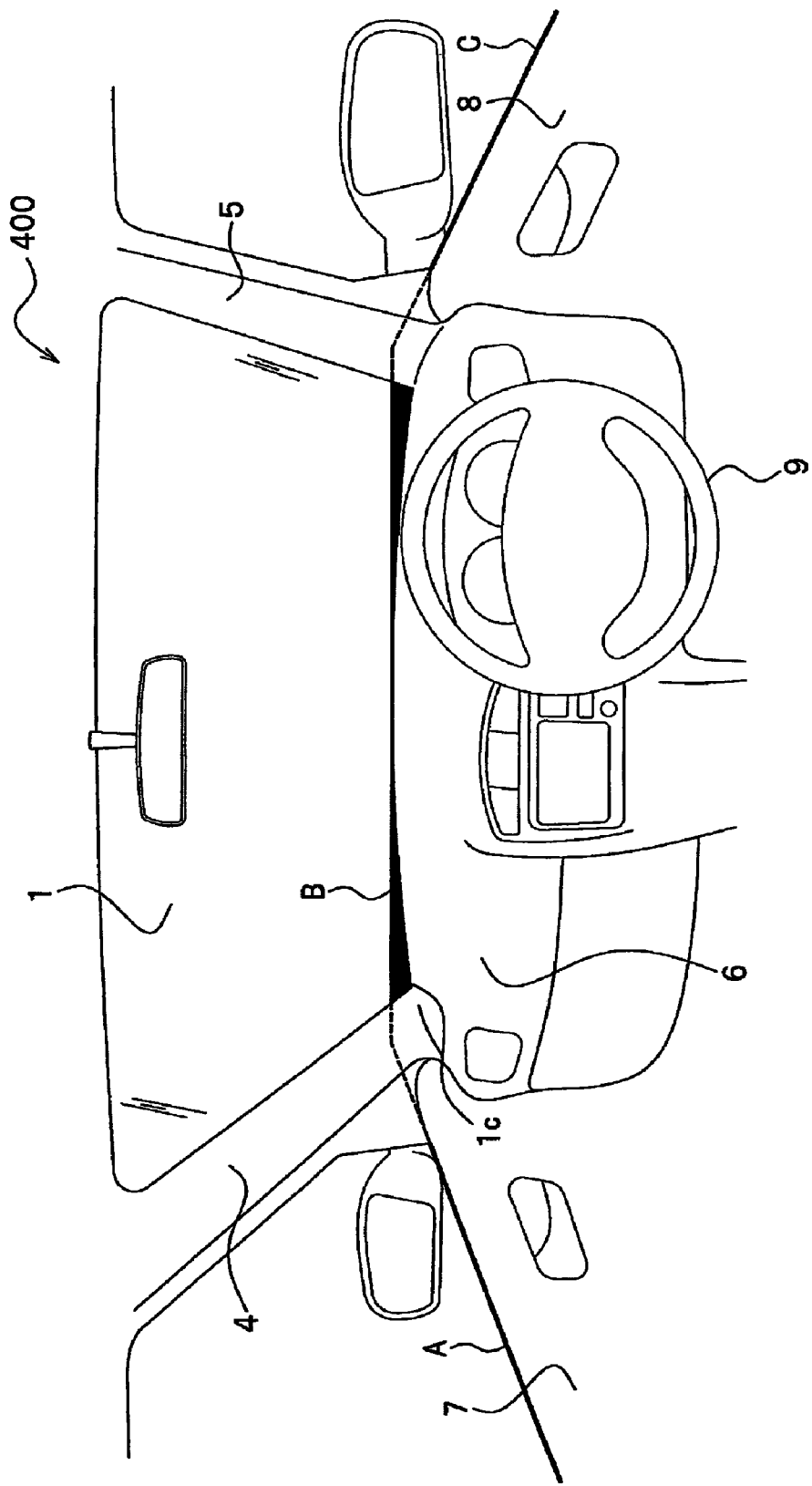
FIG. 9 is a schematic diagram showing a front window shield for a vehicle in an embodiment 3.

Now, a front window shield for a vehicle in Embodiment 3 will be described, referring to a schematic diagram, shown in FIG. 9. Reference symbols 1, 4, 5, 6, 7, 8 and 9 in FIG. 9 represent the same element as the corresponding elements shown in FIG. 1. For a vehicle 400, the bottom end portion B of a front window shield 1 is in a substantially horizontal linear shape when viewed from the driving seat. The left end of the bottom end portion B intersects a horizontal waist line A on a left front pillar 4, and the right end of the bottom end portion B intersects a waist line C on a right front pillar 5. Accordingly, the bottom end portion B, waist lines A and C are at the same height.

The bottom end portion B is structured by a black ceramic (end assistance) 1c formed in a substantially horizontal curve which is visually perceived in a substantially horizontal linear shape when viewed from the driving seat. As the front window shield 1 is formed in a curved surface being convex forward, the bottom end of this front window shield 1 figures a curve. A black ceramic 1c is formed at the bottom end of the front window shield 1, a bottom end portion B figuring a line, in such a manner that the central part is thin, and the closer to the left end or right end a position is, the larger the width of the bottom end at the position is. Thus, the driver can perceive a frame by the waist line A, bottom end portion B and waist line C.

Figure 10:
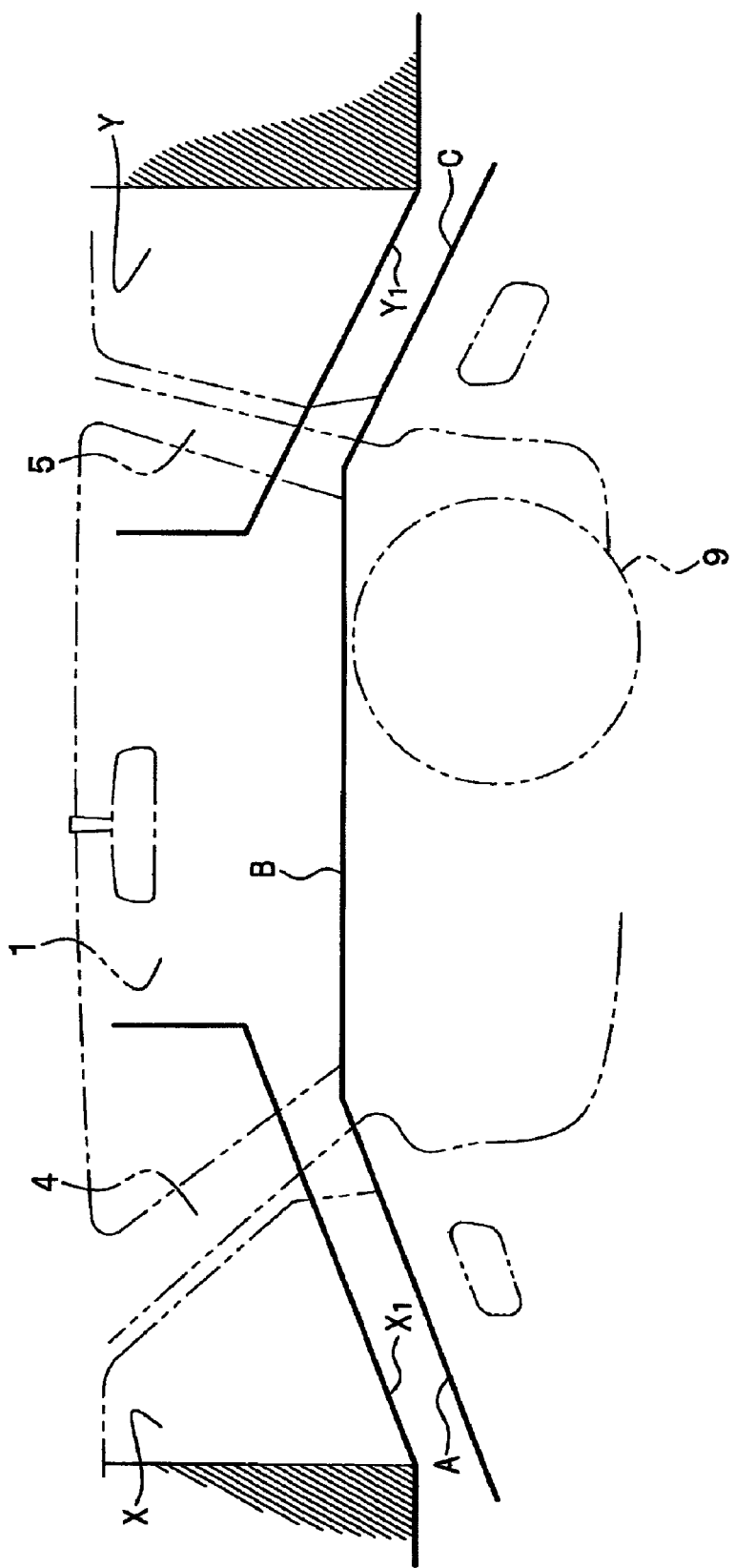
FIG. 10 is a schematic diagram showing the state of visual perception of the sides of the front window shield for a vehicle, shown in FIG. 9.

Next, a method of visually perceiving the circumstance outside the vehicle by the use of the frame will be described. FIG. 10 is a schematic diagram showing the state of visual perception of the sides at the front window shield shown in FIG. 9. When the driver who is positioning on the steering 9 side visually perceives the frame, the driver can know the length of the bottom end portion B between the waist line A and waist line C, at a distance about 1 meter from the driver, which allows the driver to estimate the vehicle width by sense perception.

Then, comparing a line X1 of the left building X and the waist line A, comparing a line Y1 of the right building Y and the waist line C, and taking into account the length of the bottom end portion B (vehicle width), the driver can easily have the distance sense in terms of the relationship between the road width ahead and the vehicle width and the left-right distance sense, by sense perception. In such a manner, the driver is always allowed to perceive the position relationship between the own vehicle and the circumstance by the frame (comparator) while driving the vehicle. Accordingly, in the present Embodiment 3, the accuracy of the visual perception and vehicle-width perception of the driver is improved to assist the driving sense.

In the present embodiment 3, although the bottom end portion B is formed of black ceramic 1c, another colorant or a seal may be used to form the bottom end portion B, the same as in Embodiment 1. Further, if the instrument panel 6 is formed in a linear shape, and the bottom end of the front window shield 1 is formed to be hidden from the view of the driver, then accordingly a bottom end portion B can be formed likewise. Further, the black ceramic 1c and the instrument panel 6 may be used in collaboration to form a bottom end portion B. When the front window shield 1 is in a flat-plate shape, the bottom end portion B can be formed in a linear shape.

Since the bottom end portion B of the front window shield is in a substantially horizontal linear shape, as described above, the both left and right ends of the bottom end portion B intersect the left front pillar 4 and the right front pillar 5 on the respective sides such as to be visually perceived to form an edge shape at the intersections. Therefore, even with this structure, the driver is enabled to perceive the vehicle-width by the frame formed by the bottom end portion B of the front window shield 1, the left front pillar 4 and the right front pillar 5, and thus the driving sense is assisted.

Figure 12A:
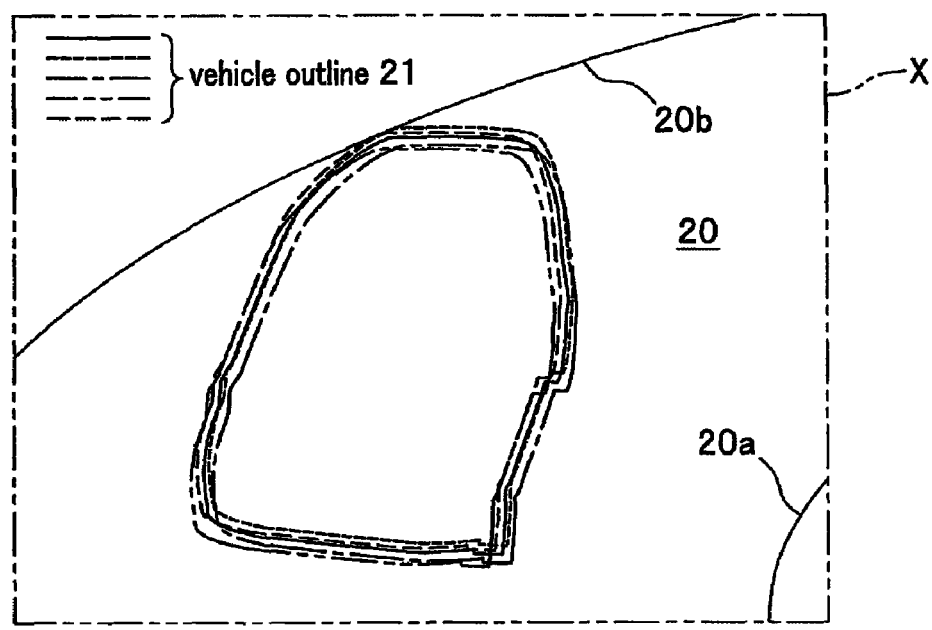
FIG. 12A is a partial perspective view showing the state of position deviation of the outline of the vehicle made during each circuit when the vehicle provided with the front window shield in Embodiment 3 passes the region enclosed by X in FIG. 11 for plural times.
Figure 12B:
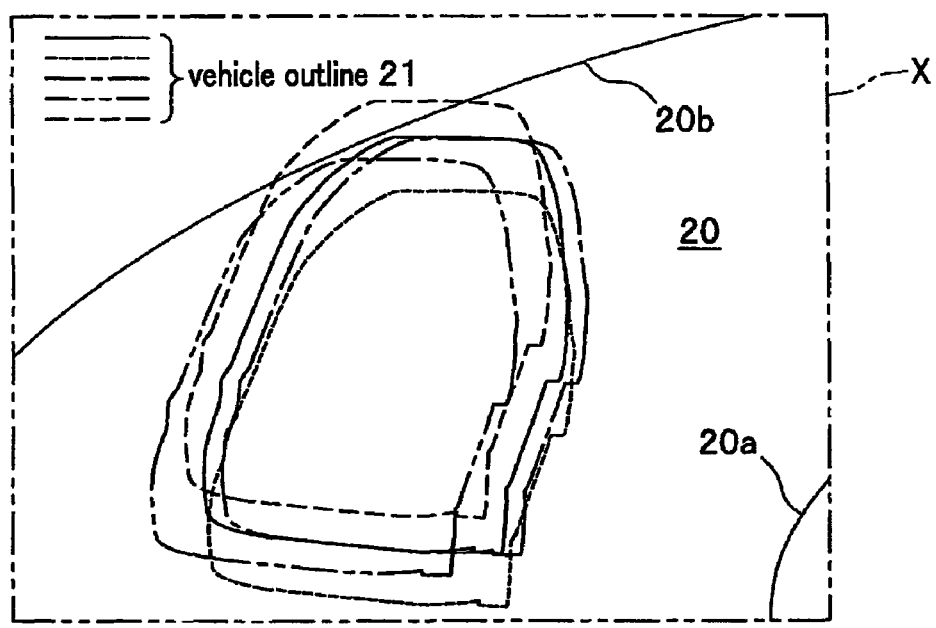
FIG. 12B is a partial perspective view showing the state of position deviation of the outline of the vehicle made during each circuit when a vehicle provided with a front window shield as a comparative example passes the region enclosed by X in FIG. 11 for plural times.

Next, a test (position deviation test) of position deviation of the vehicle 400 was carried out during driving the vehicle 400 provided with the front window shield 1, shown in FIG. 9, in Embodiment 3 in a circular circuit course. FIG. 11, referred to here, is a perspective view showing the state where the vehicle is driven in the circuit course in the position deviation test. FIG. 12A is a partial perspective view showing the state of position deviation of the outline of the vehicle made during each circuit when the vehicle provided with the front window shield in Embodiment 3 passes the region enclosed by X in FIG. 11 for plural times. FIG. 12B is a partial perspective view showing the state of position deviation of the outline of the vehicle made during each circuit when a vehicle provided with a front window shield as a comparative example passes the region enclosed by X in FIG. 11 for plural times. Herein, the front window shield as the comparative example is a conventional front window shield with a bottom end portion thereof being located at a different height from the horizontal waist lines on the both sides.

As shown in FIG. 11, the circuit course 20 is arranged between an inner curve 20a being a circle with a radius of 8.5 m and an outer curve 20b being a concentric circle 4.5 m away outside from the inner line 20a.

During the position deviation test described-above, at first, the driver (not shown) drove the vehicle 400 provided with the front window shield 1 in Embodiment 3 between the both curves 20a and 20b, while confirming the inner line 20a and the outer line 20b of the circuit course 20 for seven laps of the circuit. Then, excluding the first and seventh lap, deviation of the outline 21 of the vehicle 400 during the rest five laps were measured for the region enclosed by X. Herein, the deviation of the outline 21 was measured by picking up an image of the vehicle 400 in the region enclosed by X when the vehicle 400 was detected by an optical sensor (not shown) arranged at a predetermined position of the circuit course 20.

Next, another position deviation test was carried out in the same manner as that for the vehicle 400 except that a vehicle 400' provided with the front window shield as the comparative example described-above was used instead of the vehicle 400. The result is shown in FIG. 12B.

As apparent from the comparison between FIG. 12A and FIG. 12B, it was confirmed that the deviation of the outline 21 of the vehicle 400 provided with the front window shield 1 in Embodiment 3 is extremely smaller than the deviation of the outline 21 of the vehicle 400' provided with the front window shield as the comparative example. It is understood that the driver (not shown) has become always able to perceive the position relationship between the vehicle 400 (refer to FIG. 11) and the circumstance (the inner curve 20a and the outer curve 20b) by the frame (comparator) formed by the bottom end portion B and the waistlines A and C, shown in FIG. 9. In other words, it was confirmed that the front window shield 1, in Embodiment 3, on which a frame (comparator) is formed near the driving seat enabled the driver to easily know the vehicle width by sense perception.

As described above, according to the invention, a window, for a vehicle, having a simple and inexpensive structure that assists driving sense can be presented.

What is claimed is:

1. A front window shield for a vehicle, located at a front part of the vehicle and configured to secure a view therethrough by a driver in the vehicle, said window shield comprising:
   a transparent window shield panel having at least two marks thereon, with a respective mark formed on each of a right and left side of the windshield and indicating a substantially horizontal direction, wherein each of the marks is shaped in a triangle comprising a base extending along a front pillar and an apex spaced away from and disposed opposite the base.

2. The front window shield for a vehicle of claim 1, wherein the marks are arranged at positions higher than an estimated eye point of the driver.

3. A front window shield for a vehicle, said window shield comprising a transparent window shield panel having at least one mark thereon and extending along an area thereof proximate a front pillar of the vehicle, said at least one mark having a substantially triangular shape comprising a base extending along an area proximate a front pillar of the vehicle, and an apex spaced away from and disposed opposite the base, said at least one mark indicating a substantially horizontal direction.

* * * * *